Aug. 4, 1970    H. W. MOORE    3,522,912
COIL WINDING MACHINE
Original Filed March 18, 1963    2 Sheets-Sheet 1
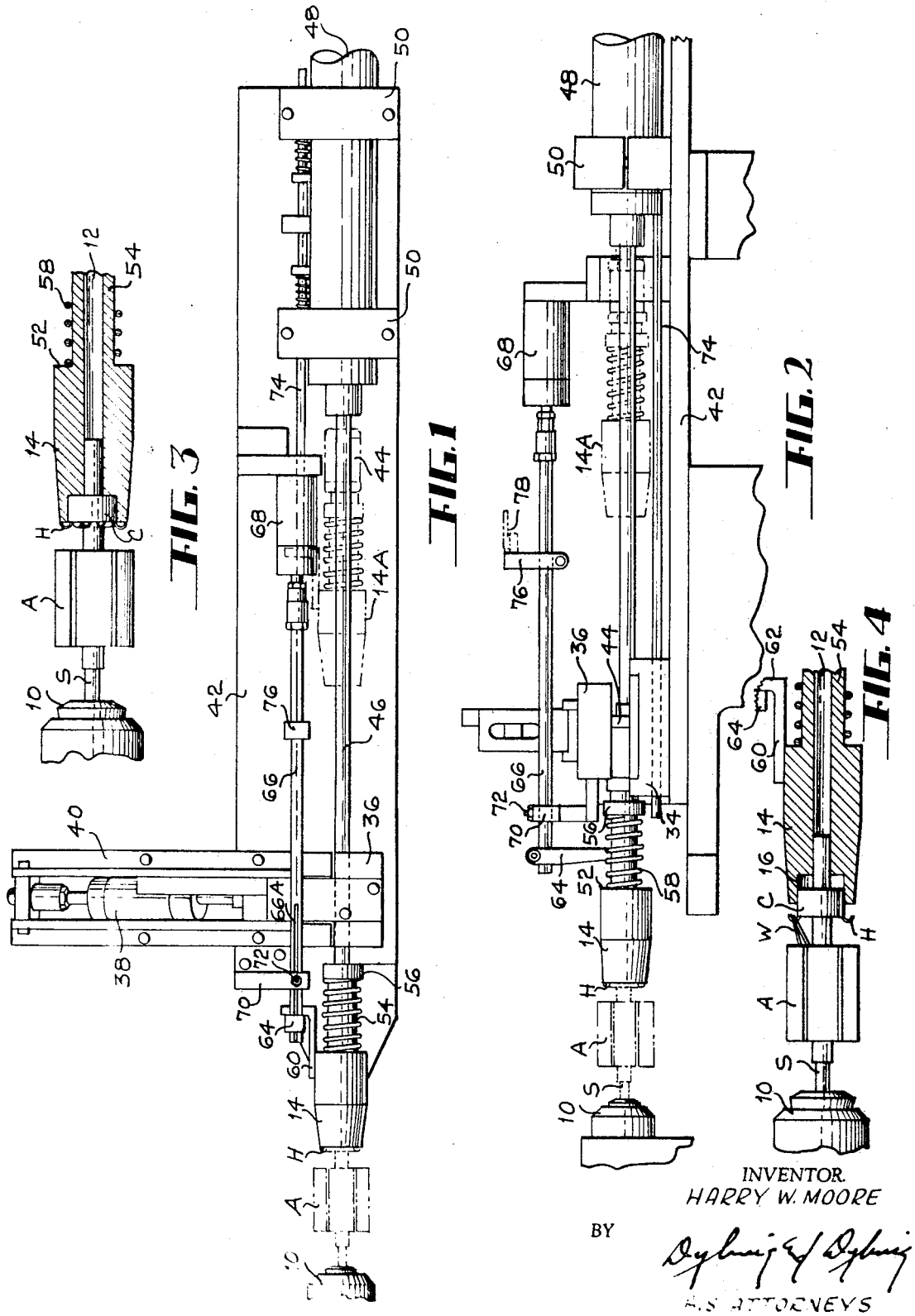
INVENTOR.
HARRY W. MOORE
BY
*Dybvig & Dybvig*
HIS ATTORNEYS

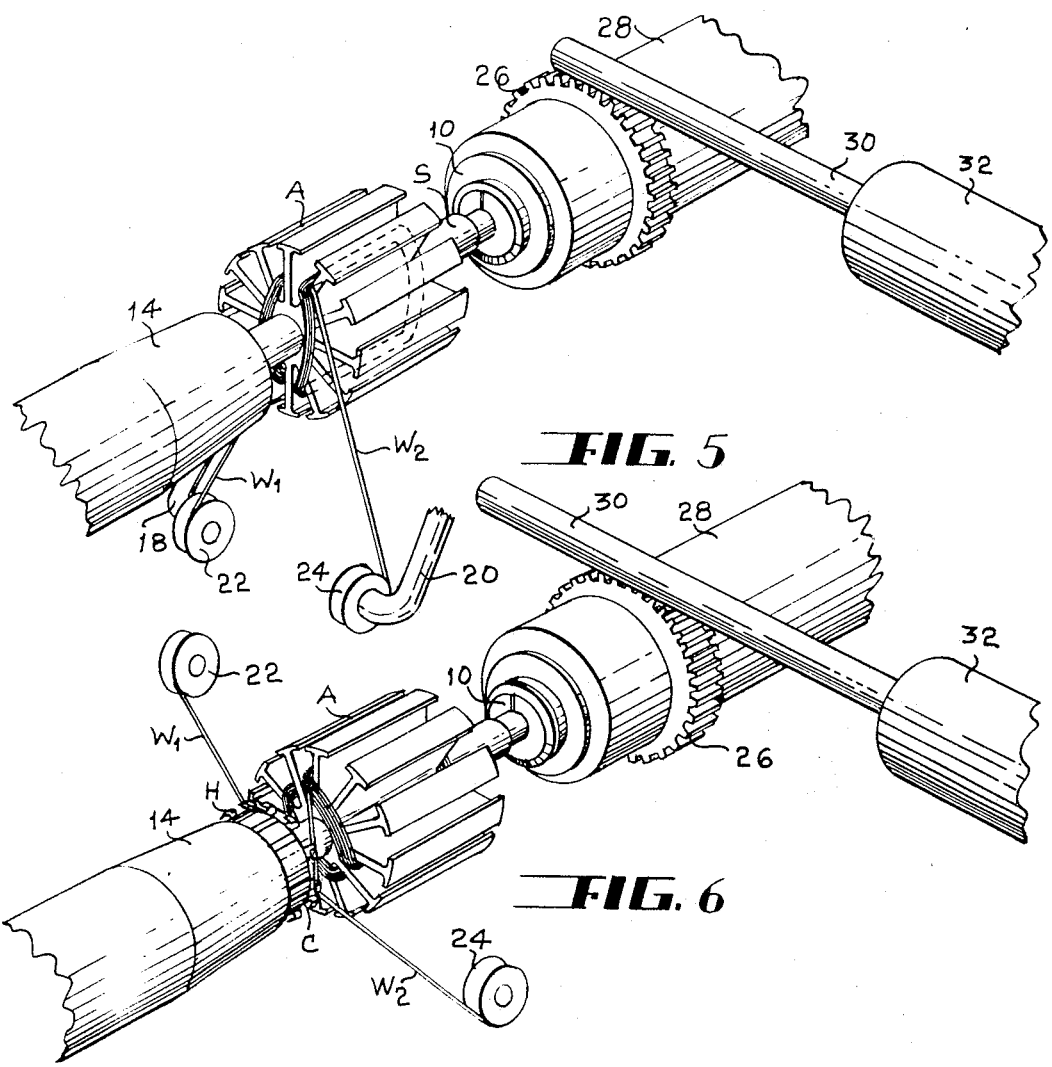

United States Patent Office 3,522,912
Patented Aug. 4, 1970

3,522,912
COIL WINDING MACHINE
Harry W. Moore, Dayton, Ohio, assignor to The Globe Tool and Engineering Company, Dayton, Ohio, a corporation of Ohio
Original application Mar. 18, 1963, Ser. No. 265,674, now Patent No. 3,395,448, dated Aug. 6, 1968. Divided and this application June 7, 1968, Ser. No. 777,511
Int. Cl. H02k 15/04
U.S. Cl. 242—7.05
3 Claims

ABSTRACT OF THE DISCLOSURE

An armature winding machine is provided with means to selectively attach coil lead wires to commutator tangs which can be circumferentially offset from their associated wound coils. The unwound armature and its commutator are mounted on a shaft supported between a collet at one end and a shield at the other end. The shield normally covers lead connector tangs on the commutator from snagging the wire during winding. A pair of flyers are rotated about a common axis transverse the axis of the stationary armture shaft to wind a pair of coils into appropriate slots in the armature. When the coils are wound, the flyers are stopped with the wire trailing therefrom. A first fluid operated piston operates a rack to rotate the armature in one direction about its own axis to aline a commutator tang with the wire extending from the flyer. Then, a second fluid-operated piston retracts the shield axially to expose the tangs to the wire. The first piston retracts the rack to rotate the armature and commutator in the opposite direction causing each of said wires to be snagged on a tang circumferentially offset from the previously wound coil. The second piston then returns the shield to cover the commutator tangs, after which additional coils can be wound.

---

This is a divisional application of Ser. No. 265,674, filed Mar. 18, 1963, and now Pat. No. 3,395,448.

This invention relates to a coil winding machine and more particularly an apparatus for attaching coil lead wires passing from coils in a slotted armature core to commutator tangs, but is not necessarily so limited.

In my copending application, Ser. No. 780,150, filed Dec. 12, 1958, now Pat. No. 3,191,269, apparatus is described for attaching coil lead wires to commutator tangs including a tang shield for preventing the wire from which the coil is wound from being attached to the commutator tangs during the winding operation. Means are provided for deflecting a lead wire after a coil has been wound and simultaneously exposing the tangs such that the lead wire is deposited upon a preselected tang. The method described therein has numerous advantages. One important advantage is that the lead wires can conveniently be attached to tangs which are circumferentially offset from the coil to which they are attached. However, the degree of circumferential offset available is limited by the construction of the apparatus described therein, since it is possible to conveniently deflect the lead wires only through rather limited angles.

An object of this invention is to provide an improved apparatus for attaching coil lead wires to commutator tangs.

A more specific object of this invention is to provide improved apparatus for attaching lead wires to commutator tangs circumferentially offset from the coil to which the lead wire is attached by an amount greater than available in the past. As will become apparent below, this object is accomplished by rotating the armature core rather than by deflecting the coil lead wires.

Other objects and advantages reside in the construction of parts, the combination thereof, the method of manufacture and mode of operation, as will become more apparent from the following description.

Referring to the drawings:
FIG. 1 is a plan view of a portion of apparatus made in accordance with this invention.
FIG. 2 is a partial side elevational view of the apparatus of FIG. 1.
FIG. 3 is an enlarged side view with portions in cross-section of structure for engaging an armature shaft and a commutator made in accordance with this invention.
FIG. 4 is an enlarged view similar to FIG. 3, but showing the parts in a different operating position.
FIG. 5 is a partial perspective view of the elements shown in FIG. 3 and, in addition, indicates the manner in which coil lead wires are attached to commutator tangs by rotating flier mechanisms and schematically illustrates means for rotating an armature core.
FIG. 6 is a perspective view similar to FIG. 5, but showing the parts in a different operating position.

Referring to FIGS. 3, 4, 5 and 6, an armature core A and a commutator C are shown mounted on a common shaft S. One end of the shaft S is shown supported by a collet mechanism 10, the construction and operation of which may be conventional. The other end of the shaft S is received within a bore 12 of a tubular commutator shield 14. The outer end of the bore 12 is enlarged to form a cup 16, which snugly receives the commutator C. The armature core A is of the conventional type having a plurality of circumferentially spaced radially extending coil receiving slots. The commutator C is of the type having a plurality of circumferentially spaced bars, each of which is provided with a tang H on the end of the commutator bars adjacent the armature core A. The tangs H are hooked away from the armature core A so that, as shown in FIG. 4, a lead wire, designated W, leading away from the armature core A may be hooked thereon. The tangs H may be integral with the commutator bars or may be formed from separate pieces electrically connected to the commutator bars, as is well known to those skilled in the art.

Referring to FIGS. 5 and 6, two strands of wire, designated $W_1$ and $W_2$ therein, are wound to form coils in pairs of slots on the armature core A by means of flier mechanisms schematically shown at 18 and 20, respectively, each of which includes a wire guide or pulley, designated 22 and 24, respectively. Fliers of this type are commonly used in coil winding machines in association with suitable coil forms. An example of such coil winding machines is illustrated in my Pat. No. 2,627,379. In accordance with this invention, the tubular shield 14 abuts the tangs H on the commutator C during the winding operation, thus preventing the wire strands $W_1$ and $W_2$ from engaging any of the tangs H. The relative position of the parts shown in FIG. 5 are at the end of the winding of a pair of coils by the two flier mechanisms 18 and 20. At this time, it is desired to connect the portions of the strands $W_1$ and $W_2$ between the coils wound in the slots of the armature core A and the fliers 22 and 24 to a pair of tangs H on the commutator C.

A ring gear 26 is affixed to a sleeve 28, which in turn is connected to the collet 10. The specific connection is not illustrated. It is to be understood that the collet may be supported for rotation in any conventional manner. The ring gear 26 is engaged by a rack 30 driven by a hydraulic or pneumatic cylinder 32 so as to rotate the collet mechanism 10 in a counterclockwise direction as viewed in FIG. 5 to that position shown in FIG. 6. During rotation of the collet mechanism 10 and, accordingly, the armature shaft S along with the commutator C and armature core A mounted thereon, the flier mechanisms 18 and 20 remain in the position shown in FIG. 5. Such rotation of the armature core A causes the wire portions $W_1$ and $W_2$ to pass adjacent a pair of spaced tangs H on the commutator C. After rotation of the armature core A, the shield 14 is retracted to expose the tangs as shown in FIG. 6. Thereafter, the fliers 18 and 20 are rotated to partially hook the wire strands $W_1$ and $W_2$ about a pair of preselected tangs H. The shield 14 is then returned to the position shown in FIG. 5, whereupon the strands $W_1$ and $W_2$ are mounted in engagement with the preselected tangs H. The collet 10, the shaft S, and the parts thereon, are then rotated back to the position shown in FIG. 5. Thereafter, the armature core A is indexed to present a new pair of slots to be provided with coils by continued rotation of the fliers 18 and 20. The indexing of the armature core can be accomplished, for example, by the indexing mechanism described in my Pat. No. 2,627,379. Of course, during such indexing, the collet clamp must be released. The foregoing steps are repeated until the desired number of coils have been wound in the commutator slots and their lead wires connected to the tangs H.

By following the method described above, the circumferential spacing between the slot from which a lead wire passes to the tang H upon which the lead wire is hooked is effectively limited only by the particular design of the finished armature desired. In other words, the armature core can be rotated through as great an angular distance as may be required by the design of the armature, since the rack 30 can be designed to rotate the ring gear 26 through any desired angle.

The specific construction of the mechanism for controlling the position of the shield 14 may take a variety of forms. FIGS. 1, 2 and 4 illustrate suitable mechanism for controlling the position of the shield 14 and providing support for an armature shaft. Referring especially to FIGS. 1 and 2, an armature assembly can be rested upon a pad 34 and held in position by a clamp 36, which is actuated by a clamping cylinder 38 mounted upon a bracket 40 upon a table 42. An armature core is so clamped to the pad 34 that its shaft is coaxial with the bore 12 within the shield 14. When an armature core is on the pad 34, the shield 14 is located in the position indicated by the dotted line 14A in FIGS. 1 and 2. The rearward end of the shield 14 is attached by an adapter 44 to a shield drive shaft 46 driven by a shield operating hydraulic or pneumatic cylinder 48 mounted by brackets 50 upon the table 42. Assuming the shield 14 to be in the dotted line position 14A shown in FIGS. 1 and 2, it is advanced by the cylinder 48 to the left into engagement with the commutator C and shaft S. For this purpose, the clamp 36 exerts sufficient pressure upon the armature core A that it remains stationary until the bottom face of the cup-shaped socket 16 is engaged with the rearward face of the commutator C. The armature assembly is then advanced to the left as viewed in FIGS. 1 and 2 until the free end of the shaft S engages the collet 10 which automatically clamps onto the shaft S. The parts are then in the full line position shown in FIGS. 1, 2 and 3 in readiness for the winding operation previously described.

At the end of a winding operation, the shield 14 is withdrawn in the following manner. Note that the shield 14 is designed to have an enlarged head portion which receives the commutator C and the end of the armature shaft S, which head portion provides an abutment surface 52 at its rearward end in surrounding relationship to a tubular rod portion 54 integral with the head portion. The rod portion 54 is slidably received within an enlarged cap portion 56 of the adapter 44. A compression spring 58 encircles the rod portion 54, coacting against the head portion 56 of the adapter and the abutment surface 52 of the shield 14, such that the shield 14 is normally in an extended position shown best in FIG. 3. Suitable stop elements (not shown) within adapted 44 prevent the shield 14 from projecting further outwardly from the position shown in FIGS. 1 through 3. An L-shaped bracket 60 having a short leg portion 62 is connected to one side of the enlarged head portion of the shield 14 such that the leg portion 62 extends normal to the longitudinal axis of the shield. When the parts are in the full line position shown in FIGS. 1 and 2, the leg portion 62 is engaged by a shield operating arm 64 which is fixedly attached to a shield control shaft 66 driven by a shield control cylinder 68. The shaft 66 is supported by a bracket 70 near the outer or free end thereof having a set screw 72 passing therethrough which engages a keyway 66A in the shaft 66 preventing rotation thereof. In order to retract the shield 14 from shielding engagement with the tangs H of a commutator C, the cylinder 68 is energized to retract the shaft 66, that is, move it to the right, as viewed in FIGS. 1 and 2, whereupon the switch operating arm 64 moves to the right causing the leg portion 62 of the bracket 60 and the shield 14 to move to the right against the bias of the spring 58. The operation as described earlier with relation to FIGS. 3, 4, 5 and 6 may then take place to lay a portion of a lead wire W over a tang H. The shield control cylinder 68 is then deenergized, whereupon the spring 58 returns the shield 14 to its tang shielding position shown in FIGS. 1 and 2. The operations described above are continued until the armature core A is completely wound. The wound armature can then be removed upon retraction of the shaft 46 by the cylinder 48. The shield 14 will then occupy the dotted line position 14A in readiness to engage a new armature core.

The control of the mechanism described above may be made semi-automatic or fully automatic by the provision of suitable switches which, for example, may be mounted adjacent a switch control shaft 74 or other parts thereof. For example, a switch actuator 76 is shown engaged with a schematically illustrated switch 78 in FIG. 2, the actuator 76 being fixedly mounted on the shaft 66. If desired, a loading track (not shown) could be provided to advance armature cores into the area of the pad 34.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Apparatus for use in providing slotted armature cores with coils and attaching lead wires to commutators having a plurality of circumferentially spaced coil lead receiving tangs, said core and said commutator being mounted on a common shaft, said apparatus including: means supporting said shaft while a coil is being wound in a pair of slots in said core; shield means shielding said tangs while said coil is being wound; means rotating said shaft after said coil is wound; and means retracting said shield means after said shaft is rotated.

2. Apparatus for use in providing slotted armature cores with coils and attaching coil lead wires to commutator bars, the bars having lead receiving tangs connected thereto, and said core and said bars being mounted on a common shaft, said apparatus including: rotatable support means supporting one end of said shaft; a tubular shield member receiving the other end of said shaft and having a portion shielding said tangs; a flier mechanism for winding a coil of wire in a pair of slots in said armature core; means rotating said support means and, accordingly, said shaft after a coil has been wound in said armature core, means moving said shield to expose at least one of said tangs after rotation of said support means whereupon said flier may be operated to connect a portion of wire between said wound coil and said flier to said one of said tangs.

3. Apparatus for use in providing slotted armature cores with coils and attaching lead wires to commutators having a plurality of circumferentially spaced coil lead receiving tangs, said core and said commutator being mounted on a common shaft, said apparatus including: means supporting said shaft while a coil is being wound in a pair of slots in said core; shield means shielding said tangs while said coil is being wound; means rotating said shaft after said coil is wound; and means moving said shield means to expose at least one of said tangs after said shaft is rotated.

References Cited

UNITED STATES PATENTS

| | | | |
|---|---|---|---|
| 2,348,948 | 5/1944 | Allen | 242—7.05 |
| 2,670,145 | 2/1954 | Biddison | 242—7.05 |
| 2,883,119 | 4/1959 | Braun | 242—7.05 |
| 3,142,890 | 8/1964 | Adams et al. | 29—605 XR |
| 3,191,269 | 6/1965 | Moore | 242—7.05 XR |

BILLY S. TAYLOR, Primary Examiner